(No Model.)

A. RIGBY.
POTATO DIGGER.

No. 408,670. Patented Aug. 6, 1889.

Witnesses.
A. Ruppert.
H. A. Daniels

Inventor:
A. Rigby
Per
Thomas P. Simpson

UNITED STATES PATENT OFFICE.

ARTEMAS RIGBY, OF OLD TOWN, MAINE.

POTATO-DIGGER.

SPECIFICATION forming part of Letters Patent No. 408,670, dated August 6, 1889.

Application filed April 13, 1889. Serial No. 307,192. (No model.)

*To all whom it may concern:*

Be it known that I, ARTEMAS RIGBY, a citizen of the United States, residing at Old Town, (Upper Stillwater,) in the county of Penobscot and State of Maine, have invented certain new and useful Improvements in Potato-Diggers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to improve the potato-digger described in Patent No. 178,191, granted May 30, 1876.

The invention will first be described in connection with the drawings, and then pointed out in the claim.

Figure 1:
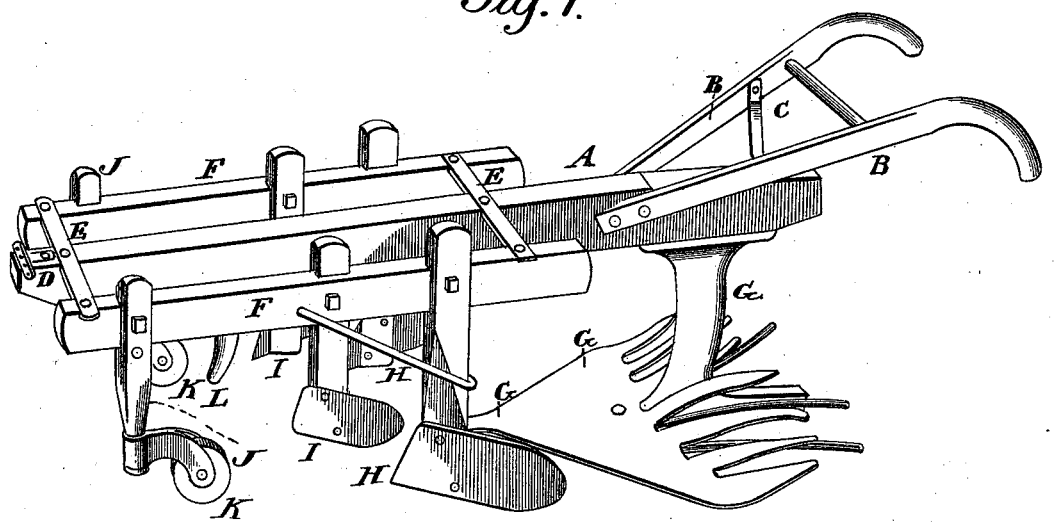
Figure 2:
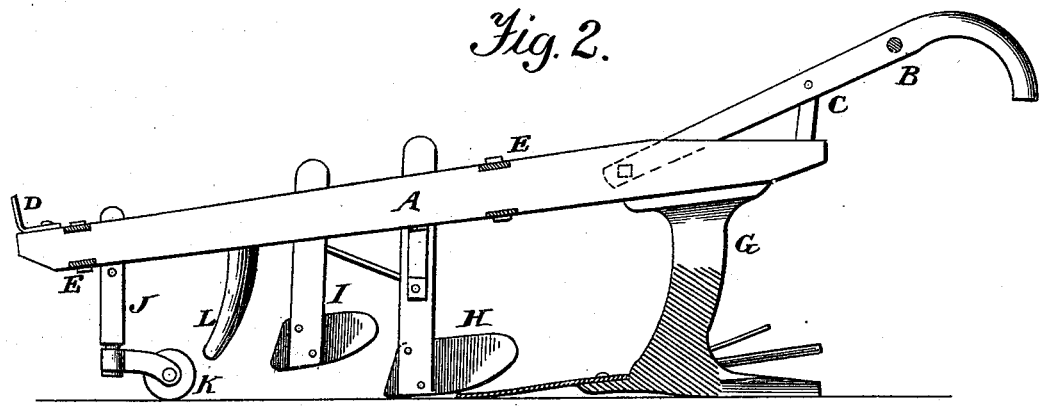

Figure 1 of the drawings is a perspective view of a potato-digger, showing my improvements; and Fig. 2, a median longitudinal vertical section thereof.

In the drawings, A represents the beam, to one end of which are attached the handles B B and handle-brace C, while to the other end is fastened the draft-iron D. On each side of beam A, and parallel thereto, are secured, by the metallic plates E, the side beams F F.

On the rear end of beam A is fastened the lifting and sifting plow G, in the usual or any suitable manner. In front of plow G, I attach to the side beams F a pair of plows H, which turn the outer part of the earth from the row of potatoes, going at the same depth as the lifting-plow which follows. On the front of beam A, I place the colter L to open the top of furrow. On the outside of the front of side beams I fasten adjustable bars J J, carrying swiveled caster-wheels K K. In front of the plows H H, and on the inside of side beams A A, I secure another pair of turn-plows I I, which do not go so deep as the plows H H, but run quite close to the potatoes, the front plows being about three inches less in depth than the rear ones. These four plows H H I I remove so much of the earth from the potatoes that the remaining dirt which passes over the lifting and sifting plow with the potatoes is completely sifted out on top of the ground, leaving all the potatoes plainly visible.

This digger is well adapted for use on all well-cultivated land.

What I claim as new, and desire to protect by Letters Patent, is—

In a potato-digger, the combination of a sifting-plow, on each side and a little in advance thereof a turning-plow H, running not quite so deep as the sifting-plow, and the turning-plows I in front of plows H, and not running so deep, but closer to the potatoes, whereby so little earth will be left to go over the sifter that all the potatoes, large and small, will be made plainly visible on the surface of the ground.

In testimony whereof I affix my signature in presence of two witnesses.

ARTEMAS RIGBY.

Witnesses:
J. V. TUCKER,
E. J. DICKEY.